March 15, 1966 C. W. FINKL 3,240,588
METHOD AND APPARATUS FOR TREATING MOLTEN METAL
Filed Jan. 9, 1961 5 Sheets-Sheet 1

INVENTOR.
Charles W. Finkl,
BY Parker & Carter
Attorneys.

March 15, 1966  C. W. FINKL  3,240,588
METHOD AND APPARATUS FOR TREATING MOLTEN METAL
Filed Jan. 9, 1961

INVENTOR.
Charles W. Finkl,
BY Parker & Carter
Attorneys.

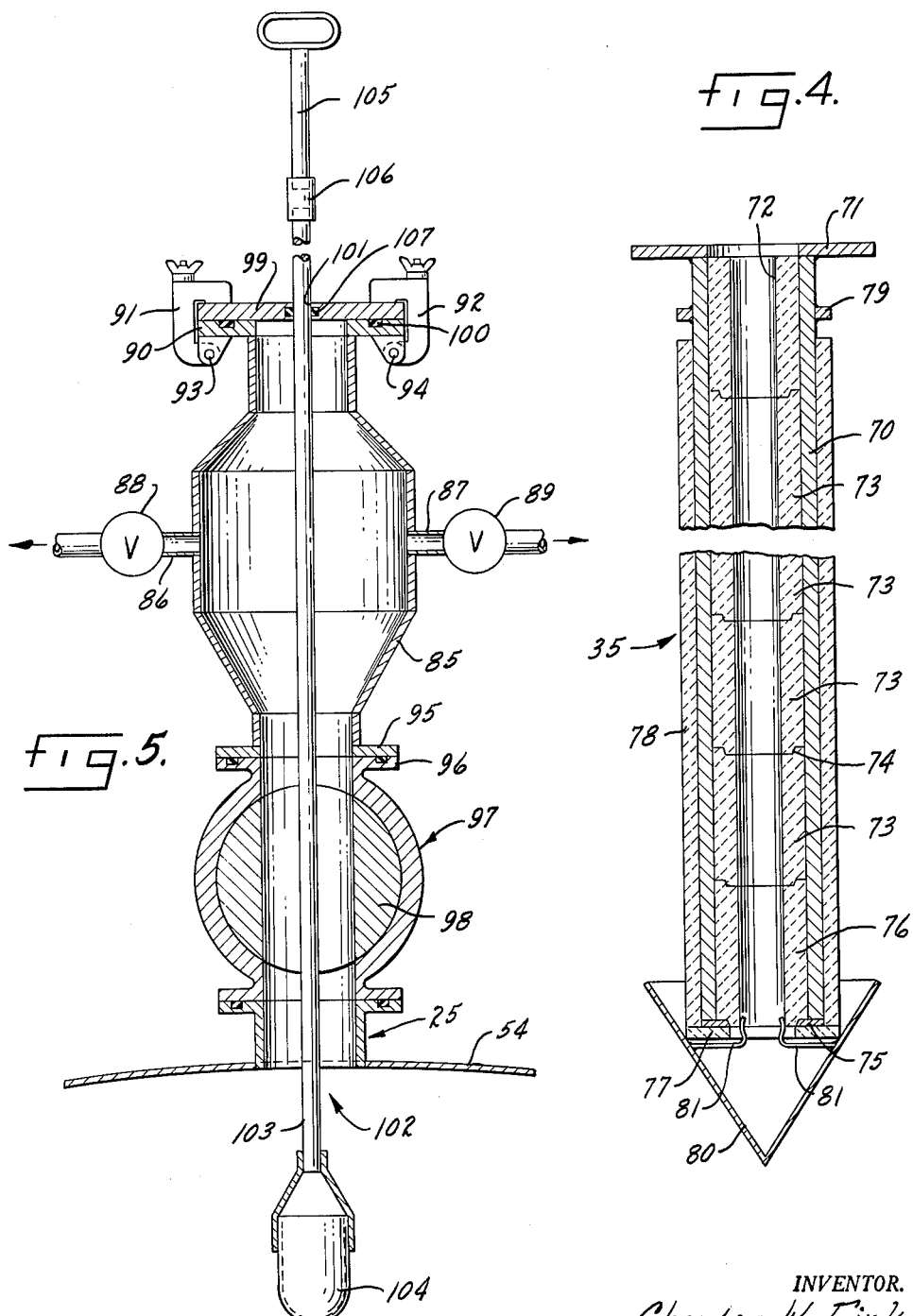

March 15, 1966   C. W. FINKL   3,240,588
METHOD AND APPARATUS FOR TREATING MOLTEN METAL
Filed Jan. 9, 1961   5 Sheets-Sheet 5

INVENTOR.
Charles W. Finkl,
BY Parker & Carter
Attorneys.

United States Patent Office 3,240,588
Patented Mar. 15, 1966

3,240,588
METHOD AND APPARATUS FOR TREATING
MOLTEN METAL
Charles W. Finkl, Chicago, Ill., assignor to A. Finkl &
Sons Co., Chicago, Ill., a corporation of Illinois
Filed Jan. 9, 1961, Ser. No. 81,338
13 Claims. (Cl. 75—49)

This invention relates generally to methods and apparatus for treating molten metal. It is specifically directed to methods and apparatus for separate or combined refining and degassing operations under vacuum using induction coils as a source of heat and agitation.

Accordingly, a primary object of the invention is to provide a method for separately or concurrently degassing and refining molten metal under vacuum for periods of time varying from a few minutes up to an hour or more.

Yet another object is to provide a system whereby molten metal may be vacuum degassed, inductively stirred, purged with a carrier agent, transferred from a treating vessel to a transfer vessel under a protective atmosphere, and teemed (if desired) in an inert gas shroud, or virtually any combination of the aforesaid degassing and refining operations.

Yet another object is to provide a system in which, in addition to all of the aforesaid operations, alloy additions may be made at any desired time.

Yet another object is to provide apparatus for transferring metal from a source such as a steel making or holding furnace to a treatment vessel and then from the treatment vessel to a transfer vessel such as a ladle without tilting the treatment vessel.

Another object is to provide an apparatus in which molten metal to be treated is maintained under either an inert atmosphere or vacuum conditions or both, all from shortly after it is tapped from the furnace until it is cooling in a mold.

Yet a further object is to provide a treatment vessel in the form of a non-magnetic stainless steel retort which can be removed from the system for maintenance, repair and inspection without disturbing the induction heating coils utilized in the treatment operations, and in which flexible electrical and vacuum connections normally required for tilting are eliminated.

Yet another object is to provide a system in which it is never necessary to tilt a molten metal containing vessel so that refractory fallout due to tilting is eliminated.

Yet a further object is to provide a system for treating molten metal in which the treatment is carried out only on liquid metal so that melting forces destructive to the furnace are eliminated.

Yet another object is to provide a system in which the induction coils are exposed to atmospheric pressures whereby the corona effect and other deleterious effects resulting from exposure of induction heating coils to vacuum condition are eliminated, and additional air cooling of the coils and coil brackets is made possible.

Yet a further object is to provide a system whereby the vessel containing the molten metal to be treated is stationary before, during, and after treatment, thereby eliminating clamping and unclamping of the coils to the treatment vessel, or to the power source if the coils are mounted on the treatment vessel.

Still another object is to provide a novel method and apparatus of transferring molten metal from a treating vessel such as a retort, to a transfer vessel such as a ladle, without exposing the molten metal to the atmosphere.

Yet another object is to provide a system for achieving the above mentioned objects and advantages which is simple in design, low in initial cost and operation, utilizes existing equipment, and requires very little head room.

Other objects and advantages will become apparent upon reading the following description.

The invention is illustrated more or less diagrammatically in the accompanying drawings, wherein:

FIGURE 4 is a sectional view of a transfer or eduction tube utilized in transferring molten metal from the treatment vessel;

FIGURE 5 is a partly diagrammatic sectional view of a hot metal sampling device.

Like reference numerals will be used to refer to like parts throughout the following description of the drawings.

Figure 1:
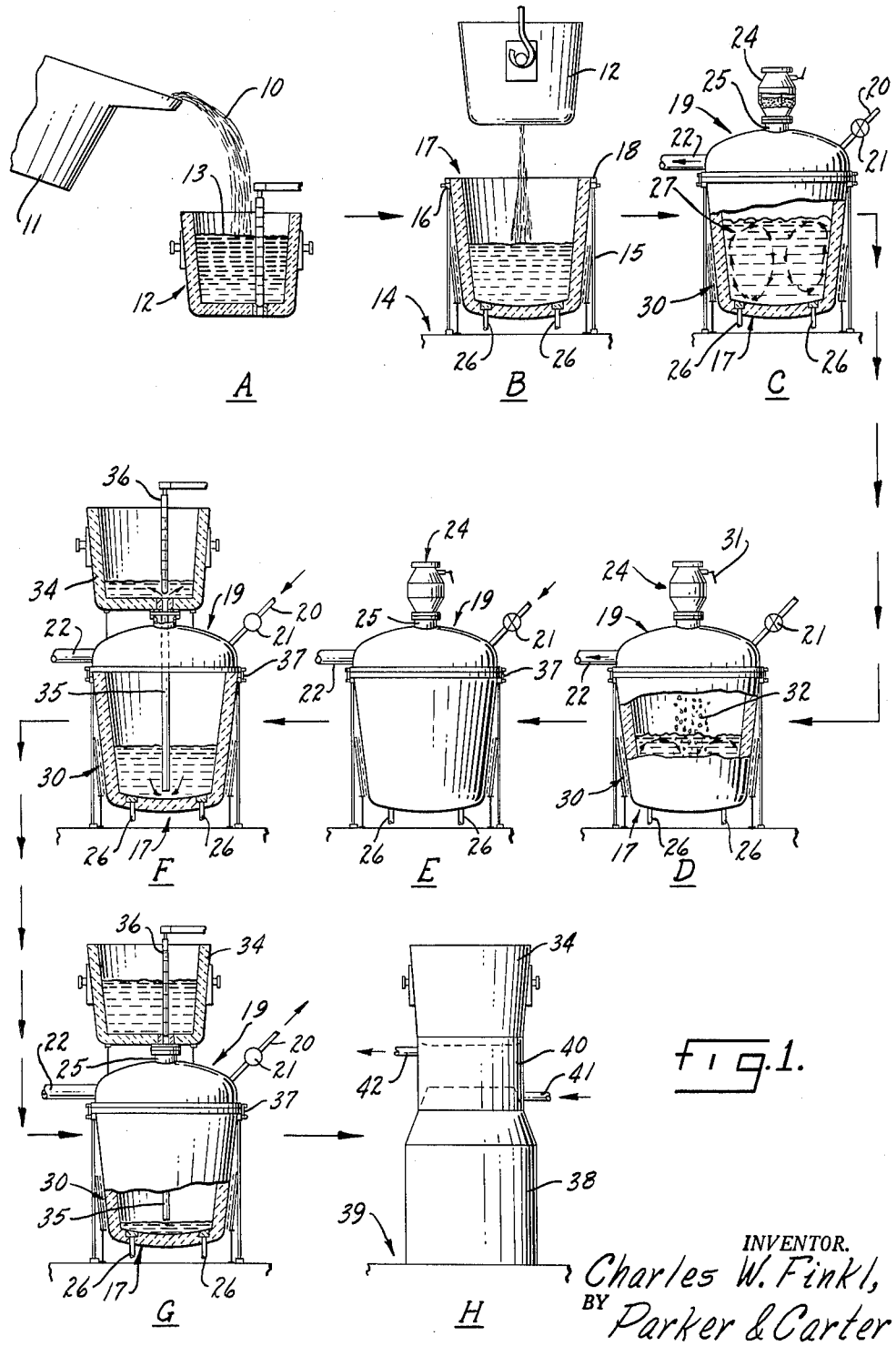
FIGURE 1 is a flow diagram illustrating a method of treating molten metal and finally teeming it into an ingot mold.

In FIGURE 1 the process of the invention is diagrammatically illustrated. In this figure, the various steps in the process are identified by a capital letter corresponding to a step or attained condition. In referring to any particular step, it will be hereafter identified by the figure number followed by the suffix identifying the particular step.

In FIGURE 1A molten metal 10 is shown being poured from a suitable melting vessel such as furnace 11 into a standard ladle 12. For treating alloy steels, the ladle should be preheated by gas flames directed against the refractory, or any other suitable means, until the refractory is heated to around 2000° F.

The molten metal level when the ladle is filled is indicated at 13 in FIGURE 1A. When this level is reached the ladle is transferred to a treating station indicated generally at 14 in FIGURE 1B. The treating station includes a supporting ring or standard 15 which terminates at its upper end in a bearing flange 16.

A retort or crucible 17, which will later be described in detail, is supported by a sealing flange 18 on the bearing flange 16 of the standard. The ladle 12 is bottom poured into the retort. Alternately, the ladle could be lip poured which would effect a substantial economy. The ladle could even be stream degassed into the retort in a manner well known in the art.

In FIGURE 1C a vacuum hood 19 has been placed over the retort 17. A sealing flange extends about the lower periphery of the hood or cover 19 and makes sealing engagement with the sealing flange 18 of the retort. The hood and retort thus form a vacuum tight envelope containing the molten metal. An inert gas admission pipe 20 having a shut-off valve 21 therein connects a source of inert gas to the vacuum envelope. A vacuum conduit 22 having a shut-off valve 23 therein (FIGURES 2 and 3) opens into the hood to connect the vacuum envelope to a vacuum system.

A ladle addition hopper 24 is secured to a short pipe 25 extending upwardly from the approximate center of the vacuum hood. At the start of a treating operation the hopper will be charged with alloys or slag forming materials, or perhaps both, and then later in the cycle the charge materials will be dropped into the melt. The connection between the addition hopper and pipe 25 is made vacuum tight so that a very low vacuum can be created in the tank and hopper when valve 21 is closed and the vacuum system turned on.

Any one of several vacuum systems, including steam ejectors, oil diffusion pumps or other well known vacuum pumps may be used. One advantage of the present system is that an oil diffusion pump, for example, may be used instead of high capacity steam ejectors due to long degassing periods permissible with induction heating.

In the condition represented by FIGURE 1C the vacuum has been drawn down to a value considerably below atmospheric pressure. At the same time a purging gas is shown bubbling upwardly through the melt from a pair of pipes 26 connected to a suitable source of supply, not shown. The low vacuum and the mechanical stirring effect caused by the upwardly traveling gas or carrier agent from pipes 26 causes a circulation indicated generally at 27. This circulation brings undegassed molten metal from regions remote from the surface to the surface. As a result, deleterious gases such as hydrogen, nitrogen, and oxygen are exposed to the vacuum and then drawn off through the vacuum system. In all probability some of the included deleterious gases migrate into the carrier agent which is generally an inert gas, or at least a gas which is inert to the metal undergoing treatment, and then carried out from the system. Movement of virgin metal to the surface may also be aided by the well known carbon monoxide boil.

It will be understood that use of a purging gas is optional. Whether it is used or not however it is desirable to always utilize induction heating coils indicated generally at 30 to cause a magnetic stirring effect in the melt. The induction coil will heat the metal adjacent the walls of the retort above the temperature of the metal adjacent the center and consequently a peripherally upward movement of molten metal will occur. Once the metal reaches the top of the melt it is exposed to the vacuum. Cooler metal is likewise moved downward adjacent the center of the retort to complete the circulation of the metal indicated by the arrows. The specific features of the induction coils, retort cooling means, and purging mechanism will be described hereafter in more detail.

The induction heating also makes up heat lost due to radiation and to alloy and slag additions.

In FIGURE 1D the melt has been substantially entirely degassed and the activating mechanism 31 for the ladle hopper has been tripped to drop the charge materials into the melt. The charge materials are indicated as a stream of discrete particles at 32. It will be understood that it is often desirable to hold off addition of deoxidizing alloys such as silicon and aluminum until the end of the degassing cycle. These alloys tend to inhibit degassing. In this figure the purging gas has been shut off but a vacuum continues to be drawn on the tank through connection 22. The actual length of the degassing cycle may vary with the size of the heat, the purity desired, time of reheat, amount of additions and other factors. In a heat of 25 to 35 tons for example it is preferable to draw a vacuum of 10 mm. and below and preferably a vacuum on the order of about one or two mm. or below for anywhere from five to fifteen minutes. In actual commercial degassing operations vacuum values on the order of 500 microns are feasible and have been widely used.

It may be feasible to obtain extremely high vacuums by the use of higher vacuum, lower volume vacuum pumps after the initial high volume degassing is complete. Such high vacuums might be obtained in decade steps of 50 or 5 microns.

After the charge addition has been added to the melt, if such an addition is desired, the melt may then be refined or maintained under vacuum for any other reason for almost any length of time. The induction coil 30 provides heat to the molten metal to prevent freezeup.

In FIGURE 1E vacuum treatment has been discontinued by closing shut-off valve 23. At the same time gas shut-off valve 21 has been opened to admit an inert gas to the vacuum envelope. Backfilling with the inert gas accomplishes three things. Firstly, it protects the surface of the molten metal from exposure to the atmosphere thereby reducing the chance of the metal reabsorbing hydrogen or other deleterious gases. It is desirable that a gas heavier than air be utilized so that should air and the inert gas be present in the vacuum envelope, the gas will form a protective blanket over the surface of the melt. Argon is a very suitable gas. Secondly, the inert gas equalizes the pressure within and without the vacuum envelope so that the addition hopper may be removed. Thirdly, the inert gas reduces the explosion hazard.

In the next step of the process, FIGURE 1F, the addition hopper 24 has been removed and a transfer ladle 34 set on top of the short pipe 25. Argon gas continues to be admitted to the vacuum envelope while the hopper is removed and transfer ladle positioned in order to prevent contact of air with the melt.

The transfer ladle 34 is positioned on top of an eductor tube 35 which extends downwardly through the short pipe 25 and terminates very close to the bottom of retort 17. It will be understood that the eductor tube could be positioned on the short pipe 25 and the transfer ladle 34 placed on tube 35 or alternately the tube or transfer ladle could be set in place as a preassembled unit. A seal is formed between the flange surrounding the upper end of the eductor tube and the top of short pipe 25 to form an air tight chamber. To conserve the wasteful free flow of argon through the eductor opening, a solid plate or valve may be placed over the opening to restrict flow of argon between the removal of the hopper and insertion of pipe 35.

Once the transfer ladle and eductor tube are positioned and the seal is made between the eductor tube and the short pipe 25, the pressure within the vacuum envelope will increase due to the continual supply of argon through conduit 20. Downward pressure of argon on the surface of the melt will force the melt upwardly through the eductor tube 35 into the transfer ladle 34. The rate of admission of argon can be increased during this transfer period. During this operation the stopper rod 36 of transfer ladle 34 is withdrawn to permit entry of the molten metal into the ladle. Stopper rod 36 may be an auxiliary rod, and the degassed heat teemed with a conventional rod.

As soon as the molten metal in retort 17 drops down to the level of the lower end of eductor tube 35 as illustrated in FIGURE 1G, stopper rod 36 is dropped on to its seat. The treated metal from the retort has thus been transferred to a transfer ladle without distrubing the induction heating coils or moving the vessels from place to place.

Since the metal in retort 17 must be raised a relatively short distance, perhaps less than 20 ft., only a relatively small pressure is created in the vacuum envelope. Assuming one atmosphere equals approximately 4½ ft. of metal and the metal is elevated aproximately 20 ft., only 4 or 5 atmospheres will be needed to transfer the melt from the retort to the ladle.

As soon as the stopper rod 36 is seated the transfer ladle may be immediately removed for further processing. Alternately, it may be desirable to bleed off argon through conduit 20 so that the pressure within the vacuum envelope approximates atmospheric pressures before transfer ladle 34 is moved. It will be understood that it is necessary to clamp or otherwise positively secure hood 19 to retort 17 by means 37 at least during that portion of the cycle in which the pressure within the hood exceeds atmospheric pressure.

In FIGURE 1H transfer ladle 34 has been moved to a position overlying an ingot mold 38 at a pouring station 39. A gas shroud or hood 40 is placed between the bottom of transfer ladle 34 and the top of the ingot mold to form an enclosure for the stream of molten metal as it is teemed into the ingot mold. Inert gas, such as argon, is admitted to the hood at its lower end by conduit 41 and discharged at its upper end through conduit 42. The melt is thus completely protected by either an inert gas or a vacuum from the time the hood 19 is positioned shortly after the metal is poured into the retort until it has been completely teemed into the ingot mold.

It will thus be seen that retort 17 is positioned on standard 15 at all times before, during, and after the treating operations. The retort can, of course, be removed for maintenance and another retort substituted for it. This enables the system to stay in operation even if retort 17 is inoperative.

Figure 2:
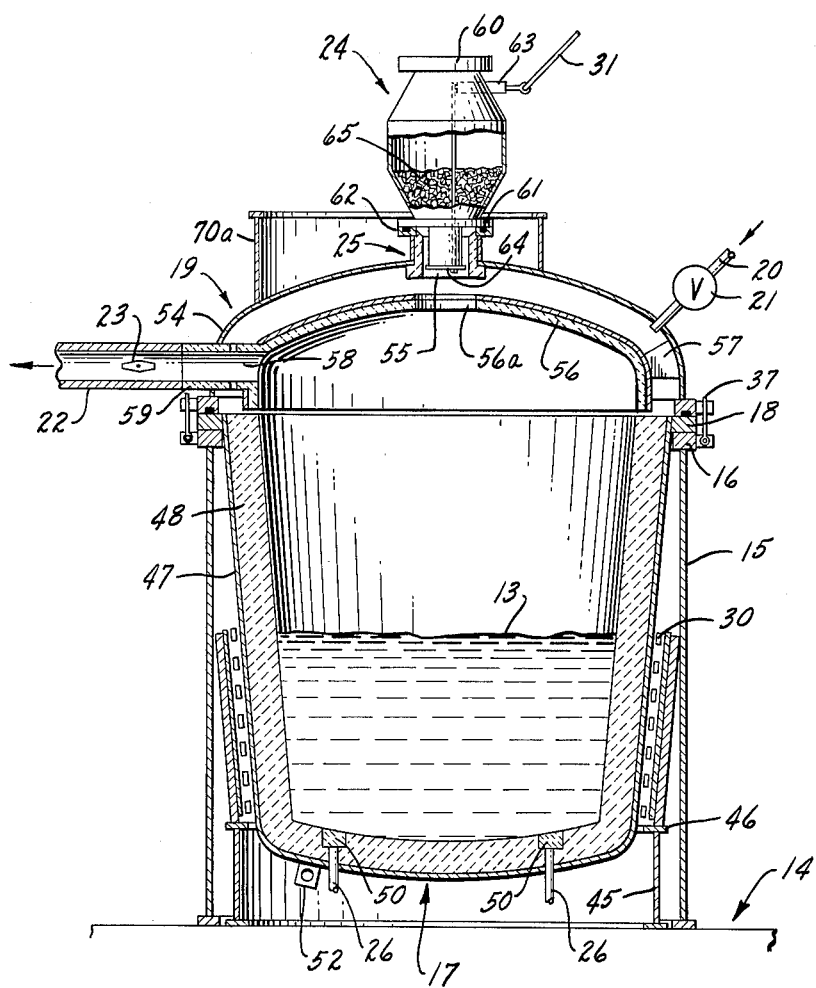
FIGURE 2 is a sectional view illustrating a molten metal containing vessel undergoing treatment.

In FIGURE 2 the vacuum hood 19, ladle addition hopper 24, retort 17, and treating station 14 are illustrated in considerably more detail.

A circular support 45 extends upwardly from the floor of the treating station just within supporting ring 15. The support 45 terminates in a narrow platform 46 which supports the water-cooled induction coil 30. It will thus be seen that since the induction coil is supported independently of the retort 17, the retort may be transferred from place to place without disturbing the coil. It may even be desirable under certain circumstances to induce a circulation of air around the induction coil by a fan or any other suitable means to reduce the heat generated.

Retort 17 consists essentially of an outer metal shell 47 and a refractory liner 48. Actually, any convenient construction may be used. It is preferable however to construct the retort wall with an electromagnetic interrupter to reduce eddy current heating having low electro-magnetic qualities. It is, therefore, desirable to construct the retort of stainless steel. Alternately, the induction coil 30 could be spaced somewhat further away from the retort 17 than indicated in FIGURE 2 and a water-cooled coil wrapped around the retort or cooled air circulated about it. It is preferable to place the coil as close to the melt as possible, because the further away it is the less efficient it is.

Purging gas pipes 26 terminate in purging plugs 50 which are set substantially flush with the bottom of the retort. Each purging plug may be of any suitable ceramic material so long as its porosity is sufficient to permit outward passage of purging gas therethrough while resisting penetration of molten metal from the retort.

An upending eye 52 welded to the bottom of the retort furnishes a support for a hook so that the retort may be tilted to remove the slag or service the refractory lining 38.

Vacuum hood 19 consists essentially of an outer metal shell 54 and a liner or radiation shield 56 secured to the shell by brackets 57. The shield 56 reduces heat loss in the retort by re-radiating heat to the melt. The shield is apertured as at 58 in line with a refractory sleeve 59 to which the vacuum conduit 22 is attached. The shell of hood 19 is likewise apertured to receive argon gas pipe 20 for purposes previously described.

The shell 54 is apertured at the center to provide a charge addition opening 55. The radiation shield is likewise apertured at 56a in line with short pipe 25 so that charge materials may drop directly from the addition hopper 24 into the melt.

The addition hopper is closed at its upper end by a top plate 60 and terminates at its lower end in an annular flange 61. The flange 61 forms a seal with a mating supporting flange 62. When handle 31 is rotated screw 63 is retracted causing bottom 64 which supports the charge material 65 to drop into the melt along with the charge materials.

Figure 3:
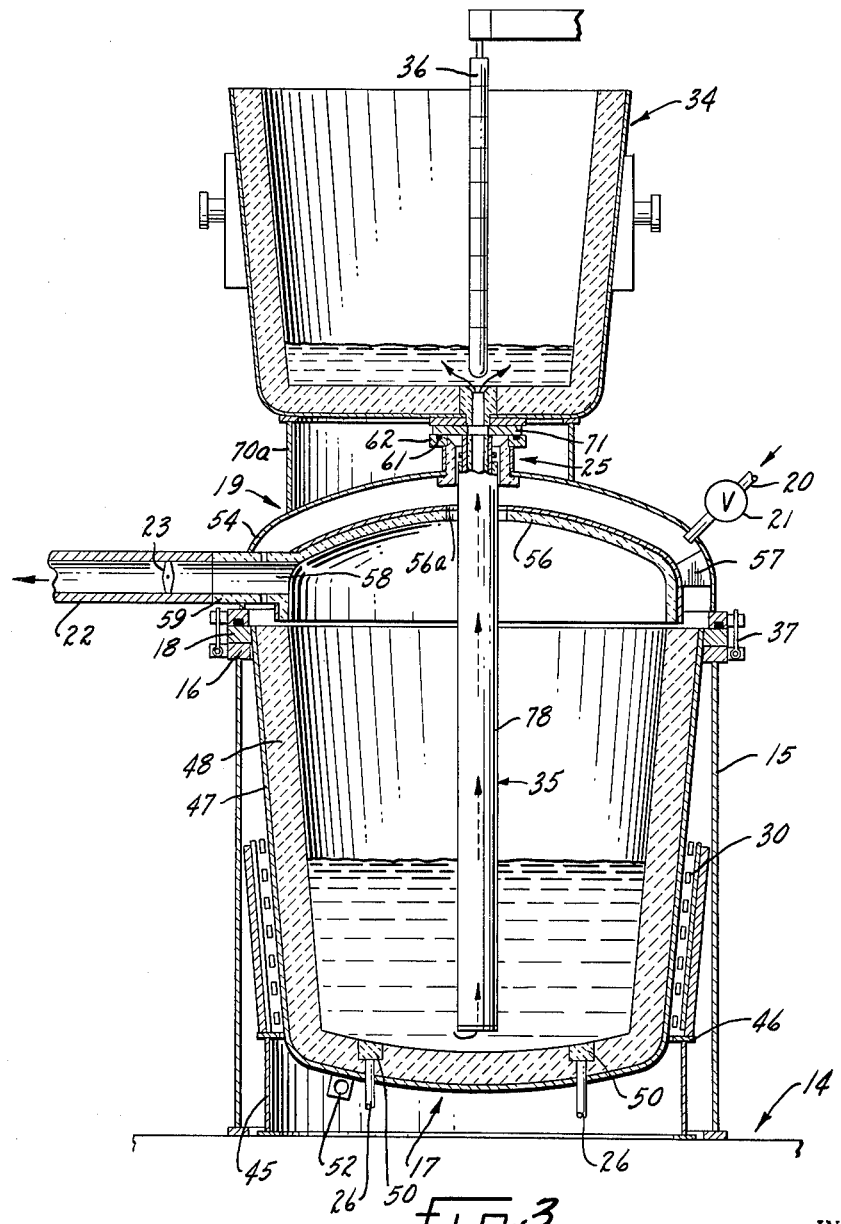
FIGURE 3 is a sectional view illustrating the transfer of treated metal from a treatment vessel to a transfer ladle.

In FIGURES 3 and 4 the metal transfer phase of the system is illustrated. The addition hopper 24 has been removed and eductor tube 35 and transfer ladle 34 placed on the flange 62 of short pipe 25. A support structure 70a provides additional support and stability for the transfer ladle.

Eductor tube 35 includes a steel pipe 70 having a flange 71 at its upper end that mounts to the bottom of ladle 34. The pipe is lined wih a refractory sleeve 72 that can be dropped into place from the flange end. Preferably the sleeve is composed of a plurality of repeating sections 73 which are offset at 74 to fit to one another. Any suitable refractory might be used. One having a high alumina content would be desirable. An annular retaining ring 75 is welded to the bottom of pipe 70. The inner periphery of the ring is sized to interlock with the bottom sleeve section 76. The ring is covered with a refractory 77. Both the ring and refractory covering should be replaced after each heat. Steel pipe 70 is covered with a protective coating of a high alumina refractory 78 to protect the tube from the erosive effect of the melt. The coating or exterior sleeve 78 may have embedded therein a heavy wire mesh to prevent it from floating upwardly due to the difference in specific gravities between the melt and the sleeve. Alternately, a stop ring 79 may be welded to the pipe about 1" above the outer sleeve to prevent it from floating in the melt. A sheet metal nose cone 80 is held in place with spring clips 81 against the inside diameter of the sleeves 73. The cone pierces the slag and takes some of the shock off the leading edge of the tube. Desirably it will melt in the amount of time needed to obtain a seal and commence siphoning. The refractory portions of the tube, particularly the sleeves 73, may be impregnated with pitch to reduce the mashing effect of the metal.

A vacuum lock for taking samples from the melt during the cycle is illustrated in FIGURE 5. The lock includes a chamber 85 into which a pair of lines 86, 87 open. Valves 88, 89 in the lines enable the chamber to be evacuated or opened to atmosphere at the proper time. The upper end of the chamber terminates in a sealing flange 90 to which C-clamps 91, 92 are hinged as at 93, 94. The lower end of the chamber terminates in a sealing flange 95 which rests on a mating flange 96 of vacuum valve 97. The lower end of the valve in turn rests on the flange on pipe 25, or a connection into the tank similar to pipe 25. Valve member 98 is rotatable by any suitable means to open and close communication between the lock chamber 85 and tank 19.

The upper end of the chamber is closed by a cover 99 which forms an airtight seal with the O-ring 100 in flange 90. The cover is apertured at 101 to receive a sampling pot assembly 102. The pot assembley includes a stem 103 from which a sampling pot 104 is suspended. The upper end of the stem is non-rotatably secured to handle portion 105 by a coupling 106. An annular expendable seal 107 in cover 99 forms an airtight sliding joint between the stem and cover.

In order to take a sample from the melt, the valve member 98 is rotated 90° from the illustrated position and C-clamps 91, 92 rotated to an open position. The sampling pot assembly 102 and plate 99 are then placed in position, preferably as a unit, and the plate tightened down. Air is then exhausted from lock chamber 85 through vacuum line 86. When the vacuum reaches the vacuum pressure in the tank, or close to it, valve member 98 is rotated to the illustrated position and the pot dropped into the bath of metal below. To remove the pot, valve member 98 is rotated 90° or until communication between the lock chamber and tank is shut off after the sampling pot is drawn upwardly into the lock chamber, and then the pressure in the chamber is brought up to atmospheric through line 87. C-clamps 91, 92 are then loosened and the sample removed.

It will be obvious to one skilled in the art that various modifications may be made within the scope of the invention. It may be convenient for example to provide an additional layer of insulation between the retort 17 and induction coil 30. The amount of free board in retort 17 will vary to some extent on the size of the melt, the rate of emission of deleterious gas, and perhaps other factors such as vacuum, temperature, and agitation. As a consequence, on melts of around 25 tons or more a free board of a minimum of three feet should be provided.

Figure 6:
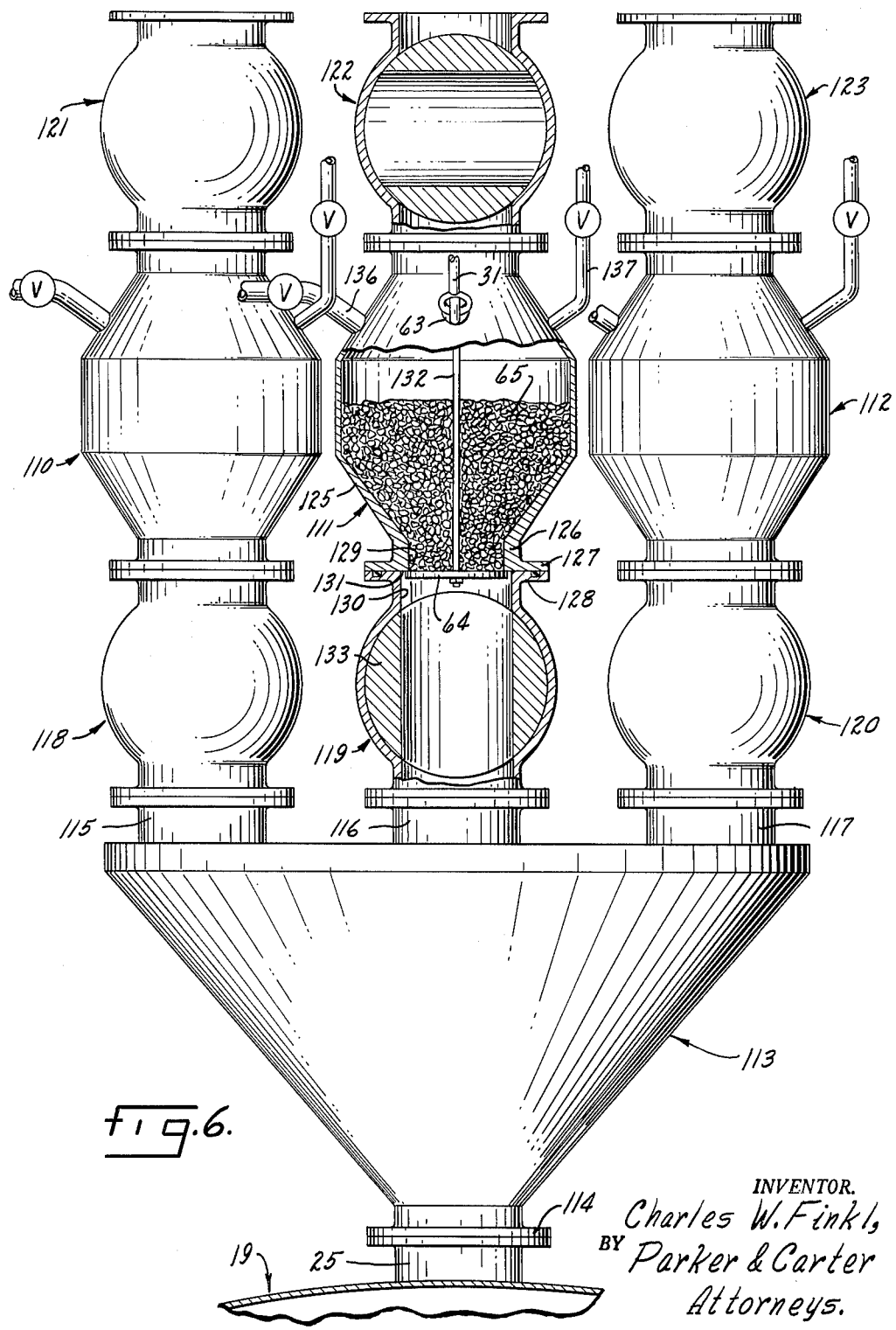
FIGURE 6 is a partly diagrammatic sectional view of a combination ladle addition hopper and sampling device.

In addition, the time and amount of alloy additions, or other charge materials, can be very closely controlled. An arrangement for this purpose is illustrated in FIGURE 6. In this figure a cluster of charge hoppers 110, 111, and 112, are arranged to discharge into a single funnel 113. A flange 114 at the lower end of the funnel rests on a mating flange on pipe 25 and is secured thereto by any suitable means. The top of the funnel is closed and three short conduits 115, 116, and 117 extend upwardly from it. Large vacuum valves 118, 119, and 120 are secured to the short conduits and the hoppers are in turn secured to the valves. Since the securing means are conventional, they are not illustrated. Likewise, it will be understood that air tight seals are formed between the abutting flanges of the conduits, valves, and hoppers.

A second set of large vacuum valves 121, 122, and 123 are similarly secured to the upper end of the hoppers. Vacuum lines, not shown, are connected to the upper vacuum valves.

One, several, or all of the hoppers may be used to treat any given heat. Since the construction of each is substantially identical, only one will be described.

Hopper 111 consists of an expanded mid-portion 125 which narrows down to a lower collar portion 126. Sealing flange 127 extends outwardly from the lower end of the collar and overlies upper sealing flange 128 of valve 119. Opening 129 in collar 126 is of a smaller diameter than passage 130 in valve 119, thus forming an annular shoulder 131 about the opening 129. Charge materials 65 are supported on bottom plate 64 which in turn is suspended from rod 132. When handle 31 is rotated, screw member 63 is retracted which permits the bottom and charge materials to fall through passage 130, valve member 133, conduit 116, funnel 113, and connection 25 into the bath. Since passage 130 and the opening in valve member 133 is larger than plate 64, the plate and charge materials will fall unobstructedly into the melt. Hopper 119 may be exhausted along with the tank since the seal between shoulder 131 and plate 64 is not air tight.

A sampling assembly similar to that illustrated in FIGURE 5 may also be passed into the bath through hopper 119. By turning valve member 133 90° from its illustrated position and proper manipulation of vacuum and pressure lines 136 and 137, the hopper can be evacuated in the same sequence as described in connection with lock chamber 85 either before or after a charge is added to the melt. In this event, a plate and pot assembly would be substituted for upper valve 122.

The system is not rendered inoperative should a retort fail for any reason. By simply substituting a second retort, the system can be kept in operation and the first one repaired at leisure. In addition, since the melt is never melted in the retort it may well be that the life of the refractory lining of the retort and transfer ladle is considerably increased. Flexible cables and vacuum lines which would be necessary if the retort were tilted during processing have been eliminated.

In addition, a high degree of skill on the part of the operators of the system is not required. For example, the operator can always tell when the metal has been completely transferred from retort 17 to transfer ladle 34 by merely observing the metal surface in the ladle. As soon as argon bubbles to the surface the operator knows that no more metal can be elevated and that it is time to seat the stopper rod 36. The invention is not limited to any particular type of alloy steel. Conventional chrome-nickel-molybdenum heats and a multiple of other analyses may be treated in an unkilled state.

It should also be observed that all of the vacuum equipment is contained in the hood 19 so that a compact easily maneuverable unit is provided. Perhaps one of the greatest advantages is the fact that the melt may be degassed without using a stopper rod. Long degassing and refining periods at temperatures on the order of 3000 degrees F. would melt any known stopper rod and this problem is, of course, avoided by the elimination of the stopper rod.

The type of current supplied to the induction heating coil 30 may be varied to meet local conditions. The frequency may be varied to suit the desired ratio of electro-magnetic stirring to heat input. The lower the frequency, the more stirring will be obtained per B.t.u. of heat input. Sixty-cycle current may be utilized but undoubtedly five or ten cycles could be employed is desired.

The foregoing description is intended to be illustrative, not definitive. Accordingly, the scope of the invention should only be limited by the scope of the appended claims.

I claim:

1. A method of treating large batches of molten metal including the steps of pouring molten metal into a stationary treatment vessel, subjecting the molten metal in the treatment vessel to a vacuum while the treatment vessel remains stationary, adding heat to the molten metal in the treatment vessel by passing induction heating currents through the molten metal, inserting a transfer tube into the molten metal near the end of the treatment, and transferring the molten metal from the stationary treatment vessel to a transfer vessel by subjecting the surface of the metal to a gas under a pressure sufficient to force the molten metal upwardly through the transfer tube extending into the transfer vessel, said gas being non-deleterious with respect to the metal undergoing treatment, said treatment vessel being maintained stationary during transfer of the molten metal into the transfer vessel.

2. The method of claim 1 further characterized by and including the step of bubbling a purging gas upwardly through the molten metal as it is being subjected to vacuum in the treatment vessel, said purging gas being passed upwardly through the melt at locations which supplement the circulation within the molten metal inducted by the induction heating currents.

3. The method of claim 1 further characterized by and including the steps of tapping the molten metal from a melting vessel into an initial transfer vessel, and then pouring the molten metal from the initial transfer vessel into the treatment vessel.

4. The method of claim 1 further characterized in that the molten metal is bottom poured into the treatment vessel.

5. The method of claim 1 further characterized in that the treated molten metal is teemed from the transfer vessel into a receptacle, such as an ingot mold, in an inert gas atmosphere.

6. The method of claim 1 in which the molten metal is subjected to a vacuum on the order of about 10 mm. of Hg or below.

7. The method of claim 1 further characterized by and including the step of passing charge material, such as deoxidizers, into the molten metal while the molten metal is being subjected to vacuum a substantial time after the molten metal is exposed to the vacuum so as to prevent inhibition of the treating process by the charge material.

8. Apparatus for treating molten metal, said apparatus consisting of a stationary molten metal treatment vessel, a hood adapted to overlie the treatment vessel, means for forming an air tight seal between the treatment vessel and the hood, means for drawing a vacuum in the space defined by the hood and treatment vessel, means for admitting and exhausting a neutral gas to the space defined by the hood and treatment vessel, and a source of induction heating current located in physically close proximity to the exterior of the treatment vessel which the hood overlies, said treatment vessel having a partially metallic wall with low electro-magnetic interrupter characteristics to thereby reduce eddy current heating.

9. The apparatus of claim 8 further characterized in that the wall of the treatment vessel is composed in part of stainless steel having low electro-magnetic qualities to thereby reduce eddy current heating.

10. The apparatus of claim 8 further characterized by and including a structure for supporting the treatment vessel and hood during treatment, said supporting structure overlying the source of induction heating current to thereby enable said source to be located physically close to the wall of the treatment vessel.

11. The apparatus of claim 8 further characterized in that the hood is apertured, and a charge material hopper is located over the aperture, said hopper being effective, when actuated, to pass charge materials into the melt.

12. Apparatus for degassing molten metal and transferring degassed molten metal to a transfer vessel preparatory to further treatment or processing, said apparatus including a treatment vessel and a vacuum hood adapted to overlie the treatment vessel, means for forming an air tight seal between the treatment vessel and the hood, means for drawing a vacuum in the space defined by the hood and treatment vessel, means for admitting a neutral gas to the space defined by the hood and treatment vessel, a source of induction heating current in close proximity to the exterior of the treatment vessel, a portable transfer vessel, said portable transfer vessel having a bottom opening adapted to be positioned in alignment with an aperture in the hood, and an eductor tube having an interior passage which provides a flow path for transferring molten metal from the treatment vessel to the portable transfer vessel, said eductor tube having first sealing means forming an air tight seal between the tube and the portable transfer vessel around the bottom opening and second sealing means forming an air tight seal between the tube and the hood around the aperture.

13. A bodily transferable eductor tube for pressure pouring molten metal from one vessel upwardly to a second vessel, said tube including a steel pipe terminating at its upper end in a flange, said flange being adapted to form a seal with the second vessel, an inner and outer refractory lining on the steel pipe, a replaceable refractory cover extending about the lower end of the refractory lined steel pipe, means for preventing the outer refractory lining from floating upwardly when the tube is immersed in molten metal having a higher specific gravity than the refractory lining, and a removeable nose cone composed of a metal compatible with the metal with which the tube is to be used secured to the lower end of the pipe and refractory coatings, said cone being sufficiently thin to melt in about the time needed to form a seal at the upper flange.

References Cited by the Examiner
UNITED STATES PATENTS

| | | | |
|---|---|---|---|
| 1,131,488 | 3/1915 | Dolensky | 266—34 |
| 1,703,739 | 2/1929 | Klepsch | 266—34 |
| 1,715,678 | 6/1929 | Schneider | 22—79 |
| 2,253,421 | 8/1941 | De Mare | 266—34 |
| 2,733,912 | 2/1956 | Newcomb et al. | 266—27 |
| 2,792,606 | 5/1957 | Sylvester | 22—200 |
| 2,806,271 | 9/1957 | Operhall | 266—34 |
| 2,929,704 | 3/1960 | Harders | 266—34 |
| 2,947,527 | 8/1960 | Spire | 266—34 |
| 2,961,722 | 11/1960 | Lilljekvist et al. | |
| 2,976,339 | 3/1961 | Gruber et al. | 266—34 |
| 2,997,756 | 8/1961 | Strom | 266—34 |

FOREIGN PATENTS 109,639  1/1940  Australia.

OTHER REFERENCES

The Iron Age, pages 108–109, June 23, 1960.

JOHN F. CAMPBELL, *Primary Examiner.*

ROGER L. CAMPBELL, RAY K. WINDHAM,
*Examiners.*